United States Patent
Betsch

[11] Patent Number: 5,868,110
[45] Date of Patent: Feb. 9, 1999

[54] CRANKCASE FOR A PISTON MACHINE

[75] Inventor: Jochen Betsch, Waiblingen, Germany

[73] Assignee: Daimler-Benz A.G., Stuttgart, Germany

[21] Appl. No.: 888,079

[22] Filed: Jul. 3, 1997

[30] Foreign Application Priority Data

Jul. 12, 1996 [DE] Germany ................ 196 28 110.5

[51] Int. Cl.⁶ ........................................ F02F 7/00
[52] U.S. Cl. .................. 123/195 R; 123/195 H; 92/261; 384/432
[58] Field of Search ............ 123/198 E, 195 R, 123/195 H; 92/146, 147, 161, 261; 384/432, 434; 74/606

[56] References Cited

U.S. PATENT DOCUMENTS

| | | | |
|---|---|---|---|
| 2,752,896 | 7/1956 | Emele et al. | 384/432 |
| 3,941,114 | 3/1976 | Seifert | 123/195 R |
| 4,189,193 | 2/1980 | Schumacher | 384/432 |
| 4,836,159 | 6/1989 | Lobig | 123/195 H |
| 4,876,998 | 10/1989 | Wünsche | 123/198 E |

FOREIGN PATENT DOCUMENTS

| | | |
|---|---|---|
| 0 145 393 | 6/1985 | European Pat. Off. . |
| 0 459 428 | 12/1991 | European Pat. Off. . |
| 2 023 954 | 8/1970 | France . |
| 33 05 731 A1 | 8/1984 | Germany . |
| 42 27 125 A1 | 2/1994 | Germany . |

Primary Examiner—Weilun Lo
Attorney, Agent, or Firm—Klaus J. Bach

[57] ABSTRACT

In a crankcase for a piston machine having a bearing support structure for a crankshaft main bearing with a bearing base part integrally formed with the bearing support structure and a bearing cover mounted onto the bearing base part by bearing bolts extending into bolt mounting columns, the bearing support structure includes a transverse wall which extends between the crankcase walls, the bearing support base and the bearing base part and includes a rib structure of an increased wall thickness formed between the bearing base part and the bearing support base and having a recess in the area between the end of a mounting bolt bore in the bolt mounting column and the bearing support base providing for a force flux path which istributes the force flux evenly over the length of the threaded mounting bolt bore area.

14 Claims, 4 Drawing Sheets

CRANKCASE FOR A PISTON MACHINE

BACKGROUND OF THE INVENTION

The invention relates to a crankcase for a piston engine or piston compressor including a bearing support structure for supporting a divided crankshaft main bearing which has a bearing part formed integrally with the bearing support structure and a bearing cover bolted to the bearing part.

Proper operation of the drive mechanism of a piston machine requires high rigidity of the crankcase and particularly of the bearing support structure in order to have the least possible form changes by external forces effective during operation.

DE OS 42 27 125 discloses a crankcase for a piston internal combustion engine including bearing support structures for mounting divided main bearings of a crankshaft and a crankshaft casing wall extending down below the crankshaft axis and connected to the bearing support structures above the crankshaft axis. The main bearing of the crankshaft comprises a bearing half disposed in the bearing support structure and a bearing cover bolted to the bearing support structure by bearing bolts screwed into heavy-walled threaded bolt holes.

The rigidity of the crankcase, or respectively, the bearing support structure is achieved by an accumulation of wall material in the area of the bolt mounting structures and the joint area between the crankcase wall and the bolt mounting structure adjacent the bearing support structure at the end remote from the crankshaft bearing and by providing reinforcement ribs on the outside of the crankcase wall and the bearing support structure. However, the utilization of such a large amount of material is contradictory to the need for light-weight crankcases.

DE OS 33 05 731 discloses a crankcase for a multi-cylinder piston type internal combustion engine with walls which extend transversely to the longitudinal engine axis and which support each a divided main bearing for the crankshaft. The main bearing consists of a bearing base portion associated with the wall and a bearing cover which is mounted onto the bearing base portion by bolts which are screwed into heavy walled bolt mounting columns. The crankcase wall extends down to an area below the crankshaft axis to about the level of the bolt heads and is connected to the bearing base portion by means of a web extending about at the level of the dividing plane of the main bearing. In addition to these webs the piston forces of the engine transmitted from the crankshaft to the main bearings are transferred to the crankcase through the bolt mounting columns in various areas of the wall which includes the main bearings. The location of these areas depend on the size of the transverse component of the piston force vector. Consequently, the rigidity of the crankcase is determined by the wall thickness of the walls supporting the main bearings. These walls must be quite strong and consequently heavy in order to provide the rigidity needed for the bolt mounting columns and the bolts received therein to remain unaffected by the transverse component of the piston force vector.

It is therefore the object of the present invention to provide a crankcase which has a relatively low weight but is still capable of withstanding relatively high dynamic loads.

SUMMARY OF THE INVENTION

In a crankcase for a piston machine having a bearing support structure for a crankshaft main bearing with a bearing base part integrally formed with the bearing support structure and a bearing cover mounted onto the bearing base part by bearing bolts extending into bolt mounting columns, the bearing support structure includes a transverse wall which extends between the crankcase walls, the bearing support base and the bearing base part and includes a rib structure of an increased wall thickness formed between the bearing base part and the bearing support base and having a recess in the area between the end of a mounting bolt bore in the bolt mounting column and the bearing support base providing for a force flux path evenly distributing the force flux over the length of the threaded mounting bolt bore area.

The recesses in the rib structures form rib legs through which the piston forces are transferred from the crankshaft main bearing of the piston machine to the bearing base structure. A threaded bore extends into the bolt mounting column for receiving a bearing bolt which bore is directed toward the bearing base structure opposite the bolt mounting column. This provides for an even load distribution of the thread of the bolted connection when loads are applied during operation of the piston machine. Preferably, the end of the rib structure becomes wider toward the bearing such that the rib structure is connected to the bearing base structure beginning at the separation plane over an arc area of 50° to 80°. As a result, the rib structure has a wide support base with a relatively small amount of material because of the recesses on the opposite sides whereby the stiffness of the bearing support structure with respect to the transverse components of the piston forces effective during operation of the piston machine is substantially increased. If the rib structure becomes wider in the form of convex curves with respect to the longitudinal extension of the rib structure, the rib structure is subjected to homogenous flux forces, while material in areas, which are not subjected to a force flux, is eliminated.

It is advantageous if the recesses on both sides of the rib structure have the same shape and are arranged opposite one another and the rib is contoured on both sides of the recess. Preferably, the recesses are essentially drop shaped or oval whereby the force fluxes on opposite sides of the recesses are combined at the longitudinal ends of the recesses to homogeneous force fluxes. At the end of the rib structure near the bearing base part, the recess is rounded and the force flux converges into the bolt mounting column such that the thread of the bearing bolt disposed in the bolt mounting column is evenly loaded.

By providing in the area of the recess a wall structure, which is relatively thin and therefore resilient as compared to the relatively highly rigid ribs it is insured that the converging force flux enters the bolt threads off the tip of the bolt, which is normally the most highly loaded area of the bolt, that is, it enters the bolt more evenly distributed over the full length of the bolt thread. In this way, the lower threads of the bolt are higher loaded taking up some of the load to which the threads at the end of the bolt are normally subjected.

It is advantageous if the bottom of the recess has a minimal wall thickness, which at most has the thickness of the transverse wall from which the rib structure projects. If the recess bottom wall is disposed in the same plane as the transverse wall and the opposite sides of the rib structure are disposed at the same distance from the transverse wall, the force flux conditions are essentially homogenous.

In an advantageous embodiment of a crankcase according to the invention, the areas of the recess adjacent the bolt are rounded, the opposite end area is pointed, and they are disposed along a line following the force input and force transfer to the bearing support base during operation of the piston machine. Furthermore, at least in the opposite end areas, the walls defining the recess are inclined or rounded to avoid stress peaks in the material.

It is particularly advantageous if the transverse wall has several webs which extend between the rib structure and the crankcase wall and which project about to the level of the side walls of the rib structure. In this way force transmission structures are formed by the relatively rigid webs in connection with the relatively thin transverse wall which provide for a good support for the main bearing at the crankcase wall and increase the rigidity of the bearing support structure. The arrangement utilizes a relatively small amount of material and is therefore relatively light-weight. For reinforcing areas of the rib structure, which are to be particularly rigid, there is preferably provided an upper web extending about at level of the rounded end of the recess, an intermediate web extending about at the level of the separation plane of the main bearing adjacent the bolt mounting column and a lower web extending from the area of the intermediate web adjacent the main bearing to the open end of the crankcase wall. The upper and the intermediate webs are essentially parallel to the separation plane of the main bearing whereby the shape of the force transmission areas is rectangular and they have a high rigidity for force flux paths which extend essentially at right angles to one another.

In the area of the wall between the rib structure in which there are little tensions because the force flux extends through the ribs the wall may have an opening whereby ventilation in the crankcase of the piston machine is improved and, furthermore, weight is saved. In order not to detrimentally affect the force flux out of the bearing mounting bolt and to prevent stress peaks in the corner areas, the opening is preferably elliptical or oval and extends about in the direction of the force flux. For a uniform force transmission and for a uniform stress load of the bearing support structure, it is advantageous if the bearing support structure is symmetrical with respect to a center plane of the main bearing extending normal to the separation plane of the main bearing.

Preferably the bearing support structure is cast as a single component whereby mass production costs are relatively low.

An embodiment of the crankcase according to the invention will be described below in greater detail on the basis of the accompanying drawings.

DESCRIPTION OF A PREFERRED EMBODIMENT

Figure 1:
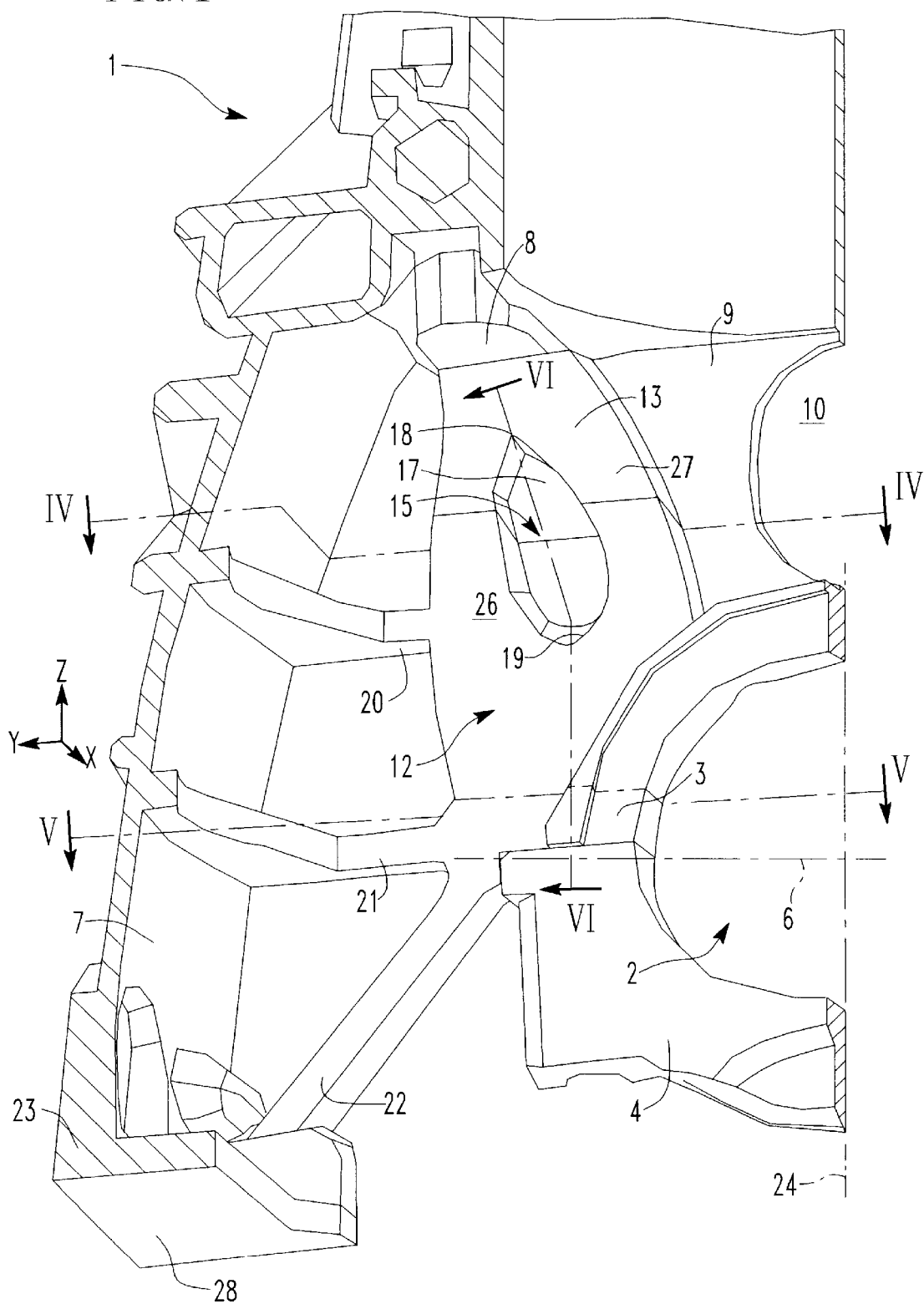
FIG. 1 is a perspective, partially sectional view of a crankcase bearing support structure.

The bearing support structure as shown in FIG. 1 serves to support a divided main bearing 2 for a crankshaft in a crankcase. The main bearing 2 which is divided along a separation plane 6 consists of a bearing base part 3 associated with the bearing support structure 1 and a bearing cover 4 bolted onto the bearing support structure 1. The main bearing 2 is connected by a transverse wall 9 to a side wall 7 and to a bearing support base 8 of the crankcase. For the force transfer from the main crankshaft bearing 2 on which the piston force is effective during operation of the piston machine the transverse wall 9 is provided with a rib structure 12 which interconnects the bearing base part 3 and the bearing support base 8. The rib structure 12 becomes wider toward the main bearing 2 in the form of arcs which extend convexly in the longitudinal direction of the rib structure and are connected from the separation plane 6 on with the bearing part 3 over an arc angle of about 75°.

The front side 13 of the rib structure 12 which projects from the transverse wall 9 in a mirror symmetric fashion includes a drop-shaped recess 15 which has a pointed end 18 adjacent the bearing support base and a rounded end 19 adjacent the main bearing 2. With the recesses 15 formed in the rib structure 12 at both sides of the transverse wall 9 and a recess wall 17 having a small wall thickness disposed in the recesses, essentially convexly extending rib legs 26, 27 are formed which transfer the force flux generated by the piston forces of the piston machine and which enters the rib legs 26, 27 from the bearing support structure. The recess 15 is disposed about centrally between the rib legs 26, 27 such that the rounded end 19 of the recess 15 is disposed about at the level of the jointure of the inner rib leg 27 with the bearing base part 3 and at a small distance from the end of the threaded bore receiving a bearing bolt (see FIG. 2). In this manner, the force flux into the thread can be controlled by the arched shape of the rib legs 26, 27 in a way as will be described below with reference to FIG. 2.

Between the rib structure 12 and the crankcase wall 7, the transverse wall 9 is provided with webs 20, 21, 22, which project from the wall 9 in a mirror symmetrical fashion with respect to the wall 9 up to the level of the front side 13 of the rib structure 12. An upper web 20 is disposed about at the level of the rounded end of the recess 15 and extends parallel to the separation plane 6 of the main bearing 2, an intermediate web 21 which is also parallel to the separation plane 6 of the main bearing extends between the bottom area of the rib structure 12 adjacent the bearing separation plane and the crankcase wall 7 and a lower web 22 extends from the area where the intermediate web 21 joins the bottom area of the rib structure 12 to the bottom end of the crankcase wall 7. Adjacent the jointure of the transverse wall 9 and the crank case wall 7, the webs 20, 21, 22 are curved in the direction of the crankcase wall 7 and then extend along the crankcase wall 7. They project from the crankcase wall 7 by about the same amount they project from the transverse wall 9 adjacent to the rib structure 12 thereby substantially increasing the rigidity of the crankcase wall 7.

The whole bearing support structure 1 of the crankcase is symmetrical with respect to the center axis 24 of the main bearing 2 which extends normal to the separation plane 6 and is formed as an integral component. At their bottom end, the end portions 23 of the crankcase wall 7 have horizontal end faces 28 on which another component of the piston machine drive arrangement such as an oil pan can be mounted. Between the rib structure 12 disposed at opposite sides of the bearing base part 3, there is in the wall 9 an oval opening 10 which improves ventilation in the crankcase and reduces the overall weight of the bearing support structure 1.

Figure 2:
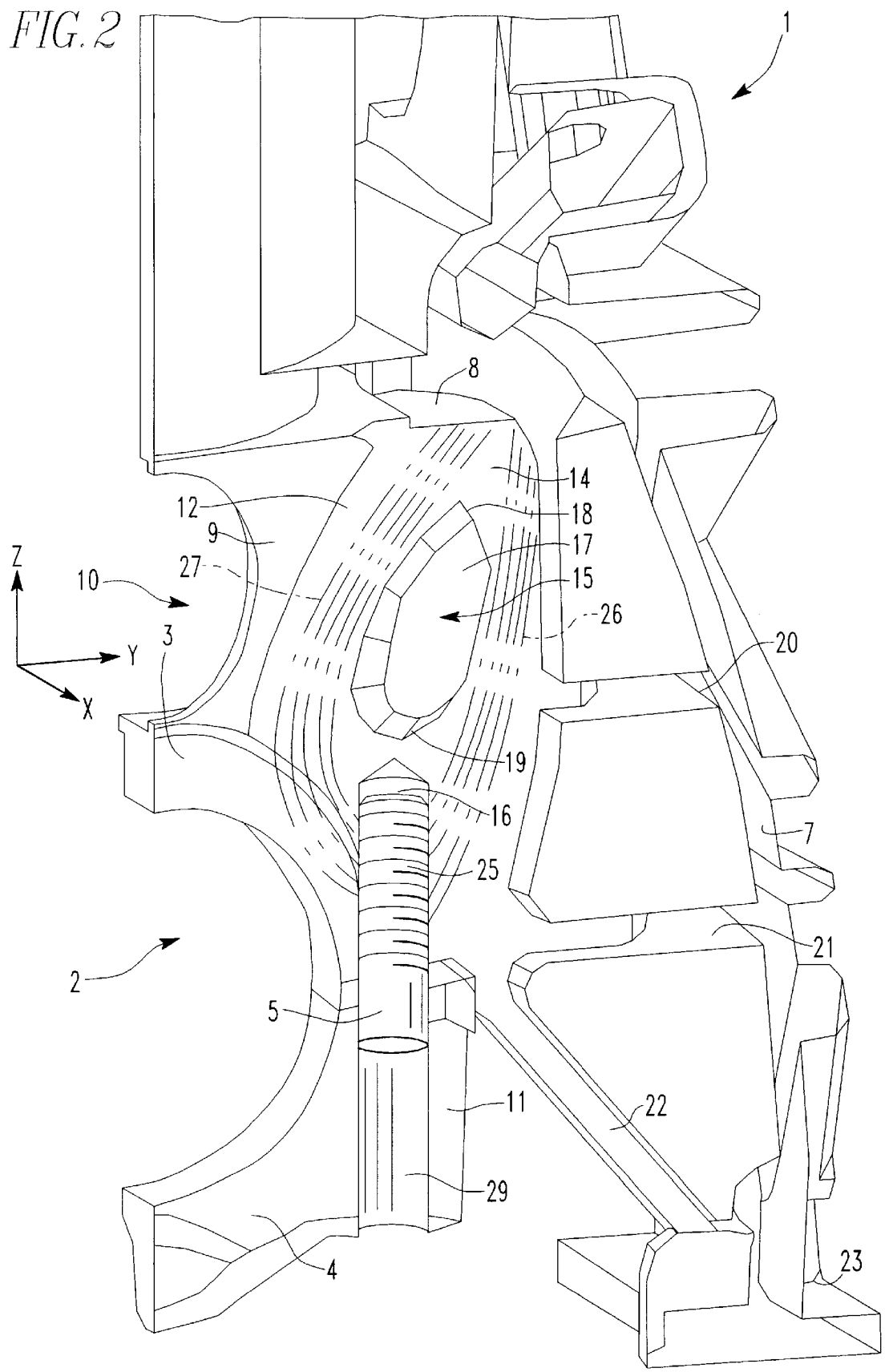
FIG. 2 is a view of the bearing support structure turned by about 180° from that shown in FIG. 1 showing the force lines effective under a piston load.

FIG. 2 shows the side of the bearing support structure opposite that shown in FIG. 1. The bearing cover 4 of the main bearing 2 of the crankshaft is mounted onto the bearing base part 3 by means of a bolt extending into a threaded bore in a bolt mounting column 11 on the rib structure 12. The bolt mounting column 11 includes in the rib structure 12 a threaded bore 16. The threaded bore 16 is directed toward the bearing structure base 8 on which the rib structure 12 supports the main bearing 2. Adjacent the bearing cover 4, the bolt mounting column 11 is a thick-walled cylinder with a longitudinal bore 29 for receiving the bolt 5 by which the bearing cover is mounted onto the bearing base part under tension. Between the threaded bore 16 and the bearing structure base 8 a drop-shaped recess 15 is disposed in the front side 14 of the rib structure 12 which projects from the wall 9 in a symmetrical fashion. The recess 15 of FIG. 2 is disposed opposite that shown in FIG. 1 on the other side of the transverse wall 9 and has the same contour. The recess 15 has a pointed end 18 disposed adjacent the bearing structure base 8 and a rounded end 19 adjacent the main bearing 2 and forms convexly extending rib legs 26, 27 which become wider toward the main bearing 2. The rib legs transfer the piston forces of the piston machine effective in the main bearing 2 in divided force fluxes to the bearing structure base 8.

By providing the rib legs 26, 27 with high rigidity and the intermediate recess 15 with a relatively resilient recess bottom wall 17, the load effective on the bearing support structure 1 by the piston of the piston machine is transferred along convexly shaped force flux paths which are determined by the shape of the rib legs 26, 27 and which are shown in FIG. 2 by dash-dotted lines. The bearing bolt 5 and the threaded bore 16 in the bearing bolt mounting column 11 are uniformly stressed by the divided force flux transfer through the rib legs 26, 27. Particularly, the stresses on the threads 25 of the bolt connection consisting of bearing bolt 5 and threaded bore 16 in the bolt mounting column 11 of the rib structure 12 are moved toward the outer thread area 25 more adjacent the bolt head.

Figure 3:
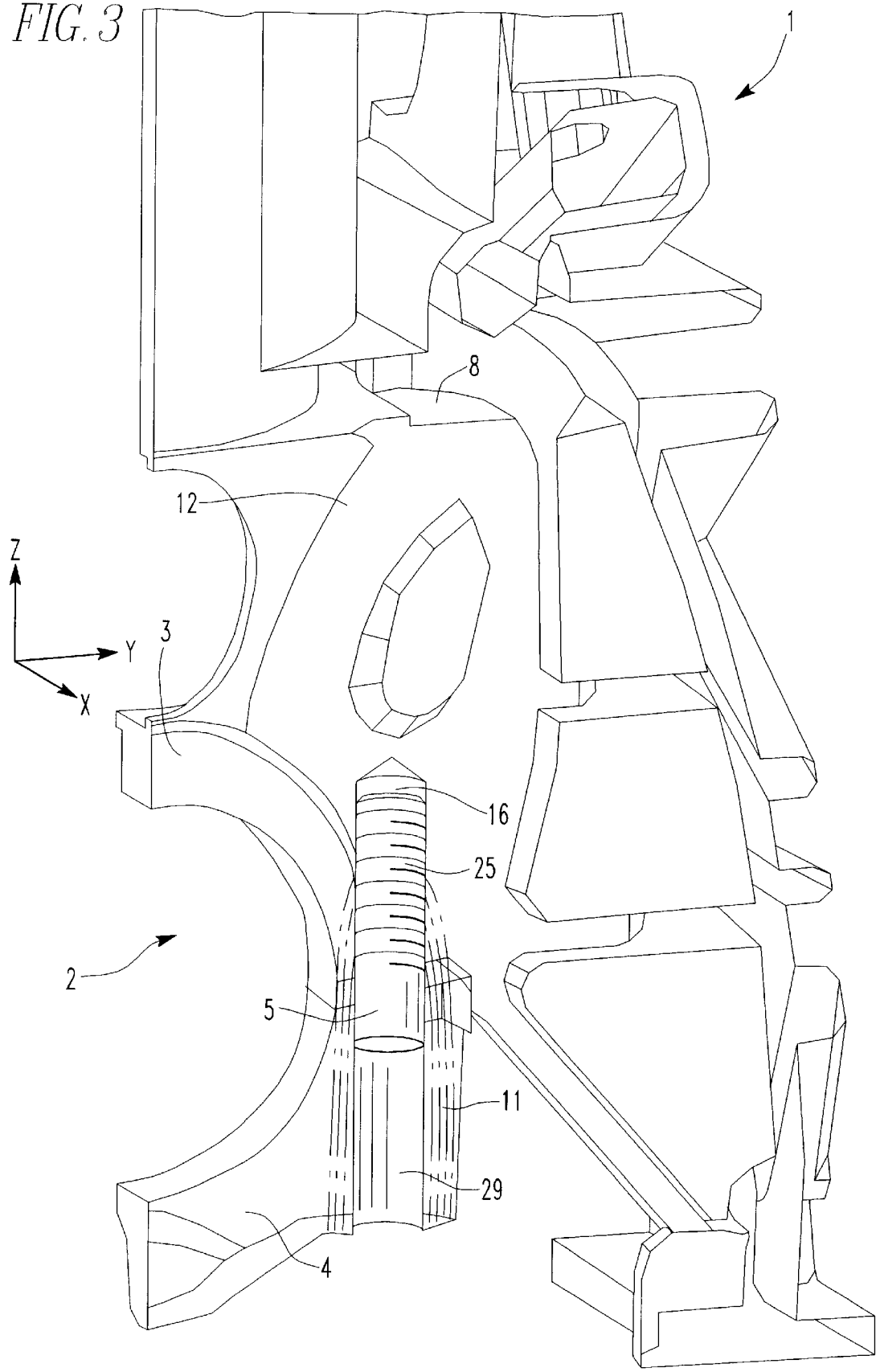
FIG. 3 is a view like that of FIG. 2 showing the force lines effective upon mounting of the bearing cover.

FIG. 3 shows a bearing support structure essentially corresponding to that of FIG. 2 with a two-legged rib structure 12 for connecting a divided main bearing 2 of the crankshaft to a bearing support structure base 8. The flux lines of the mounting forces applied by the bearing bolt 5 to the bearing support structure 1 for mounting the bearing cover 4 are shown by dash-dotted lines. When the main bearing 2 of the crankshaft is not subjected to the piston forces of the piston machine, the bolt connection is subjected essentially to the static pretension forces of the bearing bolt. The static pretension forces are greater than the maximum dynamic forces in the direction of the bolt mounting column in order to prevent the bearing cover 4 from becoming disengaged from the bearing base part 3. The bearing bolt 5 extends through a bore 29 in the part of the bolt support column 11 which is in the bearing cover 4 and is screwed into a threaded bore 16 extending into the rib structure 12. With the arrangement according to the invention mainly the bolt thread 25 near the bolt head are loaded by the pretension forces. The mounting bolt support column 11 is subjected to compression forces. The corresponding pressure tension in the bearing cover 4 is taken up by a bolt mounting column structure in the form of a thick-walled cylinder.

Figure 4:
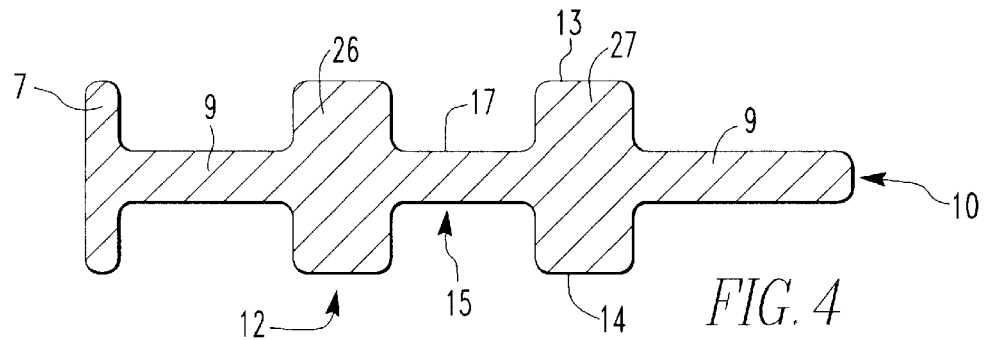
FIG. 4 is a cross-sectional view taken along line IV—IV of FIG. 1.

FIG. 4 is a cross-sectional view taken along line IV—IV of FIG. 1 wherein the transverse wall 9, extends from the ventilation opening 10 up to the crankcase housing wall 7. From the transverse wall 9 a rib structure 12 projects mirror-like from opposite sides so that the front ends 13, 14 of the rib structure 12 are disposed at the same distance from the transverse wall 9. The recesses 15 at the opposite sides 13, 14 form rib legs 26, 27 which increase the rigidity of the transverse wall 9. As a result of the high rigidity of the rib legs 26, 27 in comparison with the relatively resilient areas of the adjacent wall 9 and the recessed area 17 between the rib legs 26, 27 which has a relatively small thickness that is, in the given example, about the same as that of the wall 9, the forces are transmitted in the shown cross-section of the bearing support structure essentially through the rib legs 26, 27. The cross-section contour has rounded corners at the bottom and at the rim of the opposite sides 13, 14 of the rib legs 26, 27. This results in a reduction of stresses in the corner areas between the rib legs and the recess bottom wall 17 and the transverse wall 9 and also at the rim edges. Furthermore, it reduces the manufacturing costs of the components by casting since the shape is quite simple.

Figure 5:
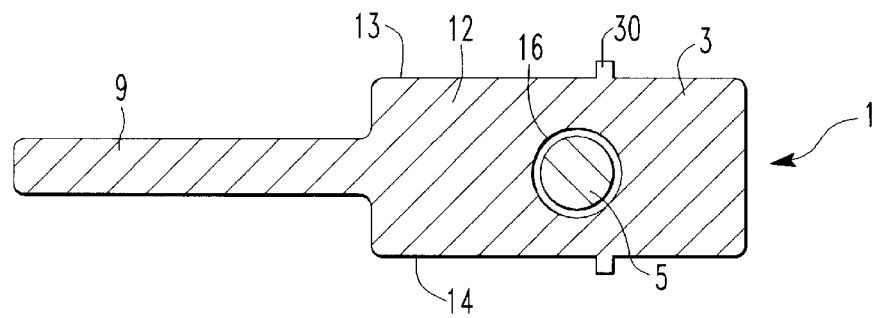
FIG. 5 is a cross-sectional view taken along line V—V of FIG. 1.

FIG. 5 is a cross-sectional view taken along line V—V of FIG. 1 showing the bearing support structure 1 above the separation plane of the main crankshaft bearing. The bearing support structure includes the rib structure 12 protruding equally from both sides of the transverse wall 9 and being joined integrally to the bearing base part 3 of the crankshaft main bearing. The rib structure 12 and the bearing base part 3 have a substantially greater wall thickness than the transverse wall 9 whereby the rigidity and the polar inertia of the structure for accommodating forces are greatly increased. In the embodiment as shown, the wall thickness of the rib structure 12 is three times that of the transverse wall 9, but the polar inertia is 27 times greater than that of the transverse wall 9. As a result, the rigidity in the area of the rib structure is increased at that rate.

Slightly eccentrically to the bearing part 3 a threaded bore 16 extends along the axis of symmetry of the cross-section of the rib structure 12, and the bearing bolt 5 for mounting the bearing cover of the divided main bearing is screwed into the threaded bore 16.

Figure 6:
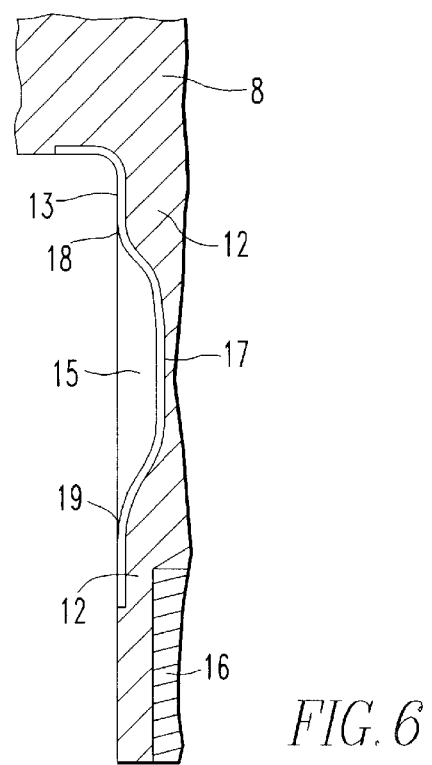
FIG. 6 is a cross-sectional view taken along line VI—VI of FIG. 1.

FIG. 6 shows, in a cross-section taken along line VI—VI of FIG. 1, the shape of the rib structure 12 by which the divided crankshaft bearing base part, which is not shown, is supported on the bearing support base 8 of the crankcase. The rib structure 12 includes, at its end opposite the bearing support base 8, the threaded bore 16 for receiving the mounting bolt of the bearing cover of the divided main bearing. Between the threaded bore 16 and the bearing support base 8, the rib structure 12 is provided with the drop-shaped recess 15 (see FIG. 1) whose "pointed" end 18 is disposed adjacent the bearing support base 8. The cross-section of the rib structure 12 at the recesses 15 is reduced smoothly down to the bottom wall 17 of the recess 15. Also, the ends 18 and 19 of the recesses are rounded in order to avoid tension peaks during force transfer through the rib structure 12 in the direction of the threaded bore 16.

What is claimed is:

1. A crankcase for a piston machine having a bearing support structure providing support for a crankshaft main bearing divided along a separation plane with a bearing base part integrally formed with said bearing support structure and a bearing cover mounted onto said bearing base part by bearing bolts extending at opposite sides of said main bearing into threaded bores of bolt mounting columns, said bearing support structure including a crankcase wall extending beyond the separation plane of said main bearing and a transverse wall extending between said bearing base part, said crankcase wall and a bearing support base of said machine, said transverse wall including a rib structure formed on said transverse wall by an increased wall thickness and extending on said transverse wall between said bearing base part and said bearing support base, said rib structure including said bolt mounting columns and having formed therein recesses extending between the end of said mounting bolt bore and said bearing support base.

2. A crankcase according to claim 1, wherein said threaded bore of said bolt mounting column extends in said rib structure in a direction toward said bearing support base.

3. A crankcase according to claim 1, wherein said rib structure becomes wider toward said bearing base part and joins the bearing base part from the bearing separation plane over an angular area of 50° to 80°.

4. A crankcase according to claim 3, wherein the opposite sides of said rib structures are widened along the longitudinal extension of said rib structures in the form of convexly shaped arcs.

5. A crankcase according to claim 1, wherein said recesses at opposite sides of said rib structure have the same shape and are disposed opposite one another and form at opposite sides of said recesses opposite rib legs.

6. A crankcase according to claim 1, wherein said recesses have essentially the shape of a drop with a pointed end disposed adjacent said bearing support base and a rounded end adjacent to the bearing base part.

7. A crankcase according to claim 5, wherein a wall remains at the bottom of said recesses which is disposed essentially in a common plane with said transverse wall.

8. A crankcase according to claim 7, wherein said wall disposed in said recesses has a thickness which is not greater than that of said transverse wall.

9. A crankcase according to claim 7, wherein said recesses have at least at the opposite pointed and rounded ends inclined side walls providing for a smooth diameter transition from the ribs to the recess bottom wall.

10. A crankcase according to claim 6, wherein said transverse wall includes several webs projecting essentially to the level of the rib structure and extending between said rib structure and said crankcase wall.

11. A crankcase according to claim 10, wherein an upper web extends essentially at the level of the rounded end of said recess, an intermediate web extends essentially along the separation plane of said divided main bearing adjacent to said bolt mounting column, and a lower web extends between the end of said intermediate web adjacent said bolt mounting column and the bottom end of said crankcase wall.

12. A crankcase according to claim 1, wherein, between said rib structures at opposite sides of said bearing base part, an oval opening is provided in said transverse wall so as to extend in a direction normal to the separation plane of said divided main bearing.

13. A crankcase according to claim 1, wherein said bearing support structure is symmetrical with respect to its center axis which extends normal to the separation plane of said main bearing.

14. A crankcase according to claim 1, wherein said bearing support structure is a structure formed as an integrally cast component of said crankcase.

* * * * *